United States Patent [19]

Loquenz et al.

[11] Patent Number: 5,705,073
[45] Date of Patent: Jan. 6, 1998

[54] METHOD FOR THE DISPOSAL OF EXCESS SLUDGE

[75] Inventors: Heinz Loquenz; Wolfgang Glaser; Kurt Tamandl; Peter Yaldez, all of Graz, Austria

[73] Assignee: Austrian Energy & Environment SGP/Waagner-Biro GmbH, Vienna, Austria

[21] Appl. No.: 491,863

[22] PCT Filed: Dec. 23, 1993

[86] PCT No.: PCT/AT95/00198

§ 371 Date: Aug. 9, 1995

§ 102(e) Date: Aug. 9, 1995

[87] PCT Pub. No.: WO94/15019

PCT Pub. Date: Jul. 7, 1994

[30]  Foreign Application Priority Data

Dec. 24, 1992 [AT] Austria ................................. 2573/92

[51] Int. Cl.$^6$ .............................. C02F 11/02; C02F 11/10
[52] U.S. Cl. .......................... 210/631; 210/769; 210/928
[58] Field of Search ................................. 210/631, 769, 210/751, 928

[56]  References Cited

U.S. PATENT DOCUMENTS

| 3,377,271 | 4/1968 | Cann ........................................ 210/45 |
| 3,561,922 | 2/1971 | Allen et al. ............................. 23/201 |
| 3,740,363 | 6/1973 | Fuller ...................................... 210/18 |

FOREIGN PATENT DOCUMENTS

| 0171093 | 2/1986 | European Pat. Off. . |
| 51-093051 | 9/1976 | Japan . |

*Primary Examiner*—Neil McCarthy
*Attorney, Agent, or Firm*—Steinberg, Raskin & Davidson, P.C.

[57]  ABSTRACT

A method for incinerating excess sludge from biological waste water treatment plants, in particular sludges arising from the manufacture of paper or paper pulp, preferably using the magnesium fusion process. Before incineration, the excess sludge is neutralized with the same base as used in the paper pulp process and the dust entrained by the combustion gas is precipitated to recover the base.

9 Claims, 1 Drawing Sheet

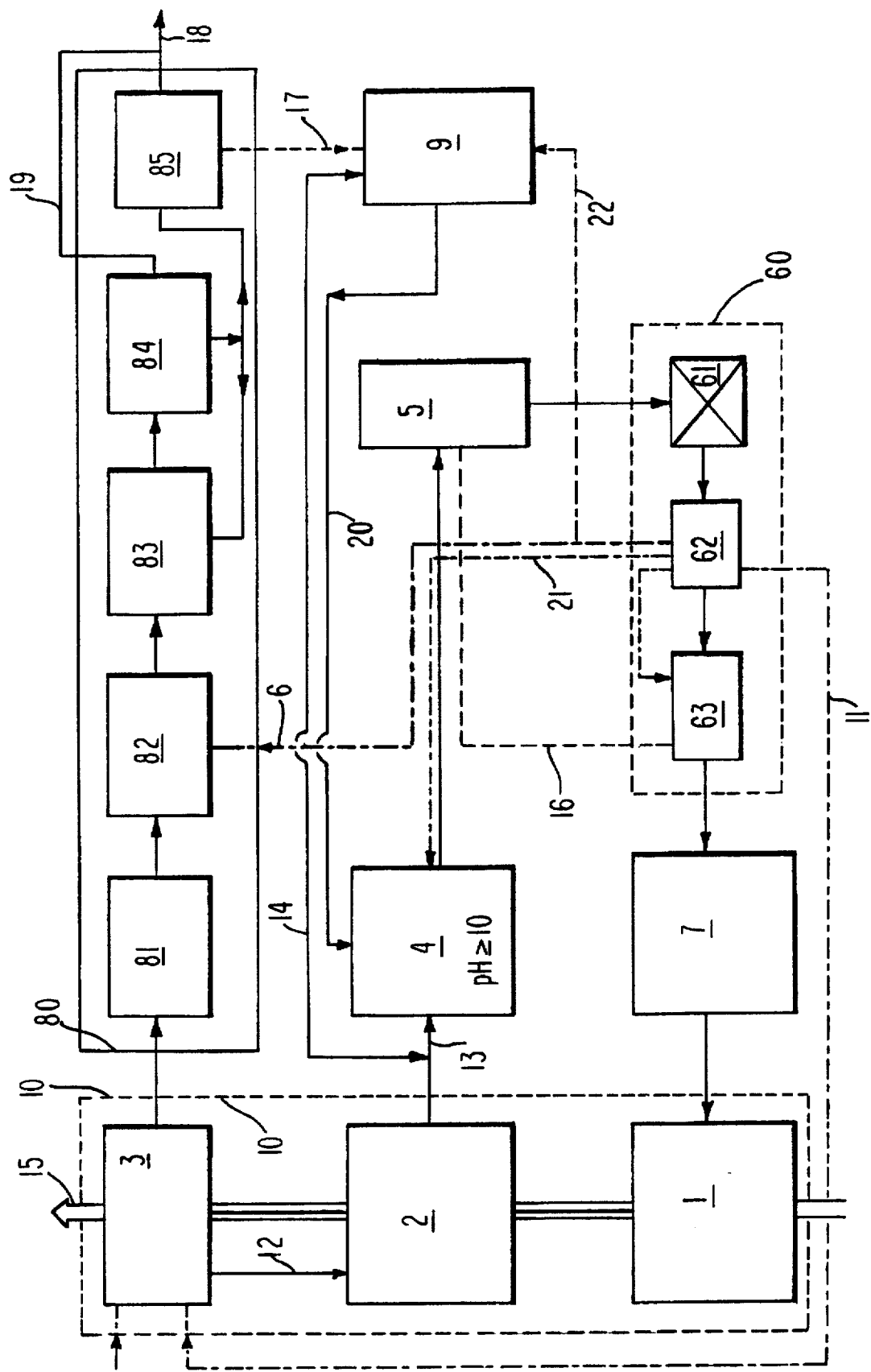

METHOD FOR THE DISPOSAL OF EXCESS SLUDGE

BACKGROUND OF THE INVENTION

The present invention relates to a method for disposing of excess sludge produced during waste water treatment in biological waste water treatment plants of paper or paper pulp manufacturing plants, with waste water neutralization takes place preferably on basis of a digestion method with magnesium oxide (MgO), whereby the waste water is neutralized with a base before entering the activation facility and whereby the excess sludge that is produced is incinerated wither directly or is mixed with another liquid fuel and is then incinerated in a furnace.

A method to lower the adhesion of the combustion chamber dust by which alkaline earth oxides or hydroxides and/or carbonates are mixed into the water lye is known from European Patent Publication No. 0 171 093. However, this method does not solve the excess sludge problem of biological sewage treatment plants for acid waste water, in particular with exhaust vapor condensates.

U.S. Pat. No. 3,740,363 describes a biological waste water treatment method for the bleaching of waste water by means of salts, in which the sludge from the settling basin and that from the biological process steps is filtered jointly, is de-watered and reduced to ashes. The ashes are mixed with the tiltrate and the fresh waste water after separation of a valuable substance. This method used in the paper pulp industry shows no connection with chemicals recovery and is therefore independent of same.

At present, the excess sludge produced in biological waste water treatment is either dumped or incinerated in a dedicated unit. In either case, the waste water is neutralized, whereby the mostly acid waste water is mixed with milk of lime for neutralization before its biological cleaning. In this situation, a significant portion of the neutralization product and/or flocculent (lime) is incorporated into the biological mass produced and appears during the combustion of the excess sludge in form of fly ash which must be disposed of, thus being an environmental pollutant. The lower heating value of the pre-dried sludge is so low, due to the relatively high water contents, that in general additional fuels are required.

Conventional incineration plants are expensive because of their special construction and the additionally required complicated exhaust-gas processing equipment but even sludge dumping is not a satisfactory solution because of the environmental pollution which is produced and also because of the cost involved, with the necessary dumping volume being very limited in most cases.

JP-A-01-109 305 describes a method by which the chemicals, such as for example MgO or CaO used pulp disintegration are recovered from the exhaust gas cleaning unit following the incineration of the used-up chemicals in that the combustion ashes are suspended in water and in that the waste gas going to the $SO_2$ absorption unit is washed with the suspension. This method has no connection with a waste water treatment plant.

The latter two methods are used together in similar form in paper pulp manufacturing plants. Since the chemicals are reclaimed where possible and since purity, in particular when recovering boiling lye, is highly prized, a consolidation is out of the question. Thereby two separate circuits with two independent incineration plants are created for different chemicals, namely a waste water treatment circuit and a waste lye treatment circuit.

OBJECT AND SUMMARY OF THE INVENTION

It is an object of the present invention to overcome the existing difficulties in the prior art and to use sludge utilization in combination with the reclamation of chemicals.

In the invention, sludge together with lye is incinerated in a lye incineration furnace and dust entrained in the combustion gas is separated and the neutralization product contained in the dust is used at least in part for the neutralization of the waste water and for the pulp disintegration. In particular, the $SO_2$ contained in the exhaust gas is absorbed by alkali or alkaline earth additions. The sludge mixture to be incarcerated is preferably compacted before incineration, in particular to 70% ACTS.

In another embodiment of the invention, the release liquor is set to a pH value greater than about 9, in particular 10, before admixture of the excess sludge, and the dust entrained by the combustion exhaust gas is leached out or sieved out to free it from undesirable accompanying substances before its utilization for the recovery or reclamation of MgO.

BRIEF DESCRIPTION OF THE DRAWING

The following drawing is illustrative of embodiments of the invention and is not meant to limit the scope of the invention as encompassed by the claims.

The FIGURE is a process diagram, e.g. for a paper pulp manufacturing plant.

DETAILED DESCRIPTION OF THE INVENTION

In a paper pulp manufacturing plant denoted generally by 10, operating by an Mg (magnesium) disintegration process, wood is fed into a digester 1 and paper pulp is obtained in the digester 1 and by dissolving away lignin or hemicellulose from the wood by means of magnesium bisulfite boiling acid. The dissolved substance is separated as extensively as possible in a receiving unit 2 downstream of the digester 1. The raw pulp produced is bleached in several steps to the desired final bleached state in a bleaching unit 3 downstream of the receiving unit 2 and into which peroxide is fed. Between the different bleaching steps, the paper pulp is washed in an opposing stream, with fresh water being used, i.e., a flow of fresh water is directed in a direction opposite to the direction of flow of the paper pulp. The washing water can be used again at least partially in the receiving unit 2 when a magnesium-oxygen-peroxide step is used. The receiving unit 2 may be a lye-receiving unit into which a sulfur-containing mixture of waste water and slurry enters.

A large portion of the bleaching waste water or other polluted plant waste water is conveyed to a biological clearing unit 80 and is cleared therein. Following an initial mechanical pre-cleaning unit 81, the mostly acid waste water is treated in a neutralization installation 82 by means of basic magnesium combinations (MgO or $Mg(OH)_2$) (i.e., the waste water is neutralized therein with a base) and is then conveyed to an activation unit 83 where the organic contents are removed in major part. The waste water is then conveyed to a sedimentation basin 84 from which part of the sludge is recirculated into the activation unit 83 and the cleaned water is removed by line 18. The excess sludge produced by this method is de-watered mechanically, e.g., by means of a filter press 85, to approximately 10% dry contents, where the wastewater is let off by line 17 whereupon it is pre-suspended in a highly neutralized release liquor in a unit 9 and is then conveyed to the release liquor neutralization unit 4. A portion of the waste lye, i.e., the sulfur-containing mixture of waste water and slurry is first directed via line 14 from the lye-receiving unit 2 to the pre-suspension unit 9 in which the slurry is suspended. The remaining portion of waste lye is directed via line 13 directly into the neutralizing unit 4. The release liquor which now contains sludge in suspended form is concentrated in the concentration unit 5 which most often has 4 to 6 steps to the highest possible contents of dry substances (ACTS) (approx. 50% to about 75%) which are finally incinerated in a waste lye combination furnace 61 of a chemicals reclamation plant 60, preferably in the manner described in Austrian Patent No. 347236.

In a separator 62 situated downstream of the combustion furnace 61, the fly ash consisting primarily of magnesium oxide is separated from the flue gas in one or more steps, and in the $SO_2$ absorption unit 63 arranged after the separator in the process direction, the sulfur dioxide is separated from the flue gas in one or more steps. In the acid production by means of the $SO_2$ absorption unit 63, magnesium oxide and sulfur dioxide are transformed simultaneously into a magnesium bisulfate solution which is again fed back in form of boiling acid to the digester 1 after a cleaning unit 7 or after strengthening for the digestion of the wood. From the separator 62, MgO is passed via line 22 to the pre-suspension unit 9. Thereafter, the suspended slurry from the suspending unit 9 is passed via line 20 to the neutralizing unit 4 to be neutralized with another portion of MgO being passed therein from the separator 62 via line 21. The water produced in the concentration unit 5 is used to obtain Mg $(HSO_3)_2$ in the absorption unit 63.

In the separator 62, MgO is obtained or washed out and is used in part for neutralization in the neutralization installation 82 and/or in the pre-suspension unit 9 as well as to increase the pH value in the neutralizing unit 4. A portion of the MgO is passed with fresh water and suspended MgO to the absorption unit 63 for further $SO_2$ absorption or Mg $(HSO_3)_2$ production. The slurry from the filter press 85 contains, in addition to the combustible organic substances, also MgO and Mg-S-containing compounds from the neutralization unit 82 and is therefore a valuable carrier of chemicals and is difficult to burn (using additional fuels) in this form. It is therefore passed via line 17 to be mixed with the compatible waste lye from the waste-lye receiving unit 2, compatible because the waste lye also contains Mg compounds after having been suspended and concentrated (units 4 and 5), and then burned in the furnace 61 together. A part of the wastewater from the filter press will be returned by the line 19.

Conduit 11 represents the flow of water from the separator 62 to the bleaching unit 3 which uses waste water. Conduit 12 represents the flow of water from the bleaching unit to the receiving unit 2. Conduit 15 represents the flow of pulp. Conduit 16 represents the flow of water from the absorption unit 63 to the concentration unit 5.

By using expensive magnesium combinations instead of inexpensive calcium combinations for the neutralization of waste water, the neutralization product appears in an immediately useable form with the fly ash after combustion, is separated in the separator 62 and is used again for waste water neutralization. As a result, the biological sewage treatment plant is included or incorporated into the existing chemical circuit. The waste water from the bleaching unit 3 is first neutralized via circuit 6 with a basic magnesium combination, preferably magnesium oxide or magnesium hydroxide from the dust collector or separator 62 of the existing chemicals reclamation plant 60. At the same time, the mechanically de-watered excess sludge of the biological sewage treatment plant is pre-suspended in release liquor with a pH value that is raised through the addition of a base to more than or equal to 10, so that the cell walls of the biomass are dissolved in part due to the increased pH value, which delays the precipitation of the suspended sludge in the release liquor. The pre-suspended sludge is then added to the neutralized release liquor before concentration and is concentrated together with the lye to 50% to 70% ACTS. The sludge-containing thick lye which is produced is now incinerated in the existing waste lye combustion rumace 61 and the neutralization chemical used for waste water neutralization is separated from the exhaust gas of the waste lye combustion furnace 61 as dust in form of magnesium oxide. Under special conditions, the excess sludge can also be mixed directly into the neutralized release liquor with an ACTS of up to 10%.

The instant method has the following advantages over the known method:

In plants producing paper pulp in a magnesium process, the excess sludge can be removed thermally essentially by using existing equipment (neutralization equipment, condensation equipment, waste lye combustion furnace and separation equipment).

The thermal utilization of the sludge is much more economic, since the residual water contained in the sludge is steamed out already before incineration, for the major part in existing installations already before incineration in a high-performance boiling-down installation so that the lower heating value of the sludge before combustion is improved considerably.

Finally, the neutralization chemicals contained in the excess sludge are recovered in reusable condition.

In conclusion, an important feature of the invention is the incorporation of the slurry from the filter press 85 into the chemical reclamation system, i.e., the combined operation of the lye-receiving unit 2, the neutralizing unit 4, the concentration unit 5 and the reclamation plant 60, so that sulfur losses in the overall installation are reduced. As a result, additional purchases of sulfur are curtailed and environmental protection is enhanced, i.e., fewer pollutants are released into the atmosphere and into the waste water. In addition, the slurry from the sedimentation basin 84 and filter press 85 is used energetically and is not dumped even without necessitating an additional burning of the slurry. This is possible only if the same neutralization product (MgO) is used in the neutralization unit 4 and in the absorption plant 62. MgO is more expensive than CaO, an alternative compound, but it is not used up and remains in the installation.

The examples provided above are not meant to be exclusive. Many other variations of the present invention would be obvious to those skilled in the art, and are contemplated to be within the scope of the appended claims.

We claim:

1. Method for disposing of sludge produced during waste water treatment in biological waste-water treatment plants with waste water neutralization operating with a magnesium oxide disintegration process for paper or paper pulp production plants comprising the steps of:

neutralizing the waste water with a base before it enters an activated sludge installation in which sludge is produced, utilizing the same base for digestion of the paper pulp, incinerating the sludge directly or first mixing the sludge with a liquid fuel and then incinerating the mixture to generate a combustion exhaust gas, separating dust entrained in the combustion exhaust gas, and utilizing the dust or the neutralization product contained in the dust at least in part for the neutralization of the waste water.

2. The method of claim 1, wherein the neutralized sludge is incinerated in a lye-burning furnace, further comprising the step of providing the dust from the combustion exhaust gas to absorb $SO_2$ contained in the combustion exhaust gas.

3. The method of claim 1, further comprising the step of concentrating the sludge mixture to be incinerated to about 50% to 70% ACTS before combustion.

4. The method of claim 1, wherein the sludge is mixed with a waste lye and the mixture then incinerated, further comprising the step of setting the waste lye to a pH value greater than about 9 before the admixture of the sludge.

5. The method of claim 1, further comprising the step of leaching or sieving the dust entrained by the combustion exhaust gas before being the dust is used for the reclamation of MgO and removal of undesirable accompanying materials.

6. The method of claim 1, wherein the sludge is mixed with a waste lye and the mixture concentrated and then incinerated in a waste lye incineration furnace, and the dust from the combustion exhaust gas from said incineration furnace is used at least in part for the neutralization of the waste water and for disintegration of the pulp.

7. The method of claim 1, wherein the sludge is incinerated directly.

8. The method of claim 1, wherein the sludge is first mixed with a waste lye and then incinerated to generate the combustion exhaust gas, said exhaust gas comprising dust.

9. The method of claim 6, said accompanying materials comprising a compound selected from the group consisting of $CaSO_3$ and $CaCO_3$.

* * * * *